US010659750B2

(12) United States Patent
Meier et al.

(10) Patent No.: US 10,659,750 B2
(45) Date of Patent: May 19, 2020

(54) METHOD AND SYSTEM FOR PRESENTING AT LEAST PART OF AN IMAGE OF A REAL OBJECT IN A VIEW OF A REAL ENVIRONMENT, AND METHOD AND SYSTEM FOR SELECTING A SUBSET OF A PLURALITY OF IMAGES

(71) Applicant: Apple Inc., Cupertino, CA (US)

(72) Inventors: Peter Meier, Los Gatos, CA (US); Lejing Wang, Sunnyvale, CA (US); Stefan Misslinger, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 220 days.

(21) Appl. No.: 15/328,349

(22) PCT Filed: Jul. 23, 2014

(86) PCT No.: PCT/EP2014/065843
§ 371 (c)(1),
(2) Date: Jan. 23, 2017

(87) PCT Pub. No.: WO2016/012041
PCT Pub. Date: Jan. 28, 2016

(65) Prior Publication Data
US 2017/0214899 A1    Jul. 27, 2017

(51) Int. Cl.
*H04N 13/111*         (2018.01)
*H04N 13/221*         (2018.01)
(Continued)

(52) U.S. Cl.
CPC ............. *H04N 13/111* (2018.05); *G06T 7/73* (2017.01); *G06T 19/006* (2013.01);
(Continued)

(58) Field of Classification Search
CPC ......... G06T 19/006; G06T 2207/30244; G06T 7/73; H04N 13/111; H04N 13/221; H04N 13/271; H04N 2013/0081
See application file for complete search history.

(56) References Cited

U.S. PATENT DOCUMENTS

2002/0158873 A1* 10/2002 Williamson ............ G06T 15/20
345/427
2003/0038875 A1*  2/2003 Ivanov .................... G06T 7/593
348/43

(Continued)

OTHER PUBLICATIONS

Agarwal, Anubhav, C. V. Jawahar, and P. J. Narayanan. "A survey of planar homography estimation techniques." Centre for Visual Information Technology, Tech. Rep. IIIT/TR/2005/12 (2005).

(Continued)

*Primary Examiner* — Peter D Le
(74) *Attorney, Agent, or Firm* — Blank Rome LLP

(57) ABSTRACT

The disclosure relates to a method and system for presenting at least part of an image of a real object in a view of a real environment, comprising providing a first image of at least part of a real object captured by a first camera, determining at least part of the real object in the first image as an object image area, determining a first 3D plane relative to the first camera, the first camera being at a position where the first image is captured, providing at least one image feature related to the real object in the first image, providing at least one first ray passing an optical center of the first camera being at a position where the first image is captured and the at least one image feature, determining, according to a first plane normal direction of the first 3D plane, at least one first angle between the first 3D plane and the at least one first ray, providing a second image of a real environment captured by a second camera, determining a second 3D plane relative to the second camera, the second camera being at a position (Continued)

where the second image is captured, mapping at least part of the object image area to a target space in a view of the real environment captured at a viewpoint, wherein the at least one image feature is mapped to at least one target position in a coordinate system of the view, determining at least one second angle between the second 3D plane and at least one second ray passing the viewpoint of capturing the view and the at least one target position according to a second plane normal direction of the second 3D plane, wherein the at least one image feature is mapped to the at least one target position such that a difference between the at least one first angle and the at least one second angle is minimized.

20 Claims, 6 Drawing Sheets

(51) Int. Cl.
  *G06T 19/00* (2011.01)
  *G06T 7/73* (2017.01)
  *H04N 13/271* (2018.01)
  *H04N 13/00* (2018.01)

(52) U.S. Cl.
  CPC ......... *H04N 13/221* (2018.05); *H04N 13/271* (2018.05); *G06T 2207/30244* (2013.01); *H04N 2013/0081* (2013.01)

(56) References Cited

U.S. PATENT DOCUMENTS

| | | | |
|---|---|---|---|
| 2004/0105573 A1* | 6/2004 | Neumann | G06T 17/00 382/103 |
| 2009/0103616 A1* | 4/2009 | Ho | G06T 1/00 375/240.12 |
| 2009/0183930 A1* | 7/2009 | Yang | G06F 3/04845 178/18.03 |
| 2010/0208033 A1* | 8/2010 | Edge | G06F 3/012 348/46 |
| 2010/0208057 A1 | 8/2010 | Meier | |
| 2011/0115886 A1* | 5/2011 | Nguyen | G06T 5/003 348/47 |
| 2011/0222757 A1* | 9/2011 | Yeatman, Jr. | H04N 13/239 382/154 |
| 2012/0062702 A1* | 3/2012 | Jiang | G06T 7/74 348/46 |
| 2012/0062988 A1* | 3/2012 | Watanabe | G02B 27/225 359/462 |
| 2013/0108187 A1* | 5/2013 | Tsai | G06T 3/0093 382/295 |
| 2013/0287289 A1* | 10/2013 | Tian | H04N 19/597 382/154 |
| 2015/0023563 A1* | 1/2015 | Koppal | G06T 5/50 382/106 |

OTHER PUBLICATIONS

Cobzas D., Jagersand M., Yerex K., "Editing Real World Scenes: Augmented Reality with Image-based Rendering," Proceedings IEEE Virtual Reality 2003, 2003, Mar. 26, 2003 (Mar. 26, 2003), pp. 291-292, XP002740461, Los Alamitos, CA, USA Retrieved from the Internet: URL: http://webdocs.cs.ualberta.ca/~vis/Papers/03vr_AR.pdf [retrieved on Jun. 3, 2015].

Davison et al., "MonoSLAM: Real-time single camera SLAM." Pattern Analysis and Machine Intelligence, IEEE Transactions on 29.6 (2007): 1052-1067.

Gruber, Lukas, et al., "Real-time photometric registration from arbitrary geometry," IEEE International Symposium on Mixed and Augmented Reality (ISMAR), 2012.

Horry Y et al., "Tour Into the Picture: Using a Spidery Mesh Interface to Make Animation from a Single Image," Computer Graphics Proceedings, SIGGRAPH 97, Los Angeles, Aug. 3-8, 1997, Reading, Addison Wesley, US, Aug. 3, 1997 (Aug. 3, 1997), pp. 225-232, XP000765820, ISBN: 978-0-201-32220-0.

Kan, Peter, and Hannes Kaufmann, "High-quality reflections, refractions, and caustics in augmented reality and their contribution to visual coherence," IEEE International Symposium on Mixed and Augmented Reality (ISMAR), 2012.

Mallick, et al., "Specularity removal in images and videos: A PDE approach," Computer Vision-ECCV 2006, Springer Berlin Heidelberg, 2006, 550-563.

McHenry, et al., "Finding glass," Computer Vision and Pattern Recognition, 2005, CVPR 2005, IEEE Computer Society Conference on, vol. 2, IEEE, 2005.

P. Debevec, "Rendering synthetic objects into real scenes: bridging traditional and image-based graphics with global illumination and high dynamic range photography," In Proceedings of the 25th annual conference on Computer graphics and interactive techniques, SIGGRAPH '98, pp. 189-198, New York, NY, USA, 1998, ACM.

Sato, I., et al., "Acquiring a radiance distribution to superimpose virtual objects onto a real scene," IEEE Transactions on Visualization and Computer Graphics 5, 1 (Jan.-Mar. 1999).

Suman Nadella, "Image Based Rendering," Andvanced Topics in Computer Graphics, CS 563, Spring Semester 2005, Mar. 10, 2005 (Mar. 10, 2005), pp. 1-47, XP55188467, Retrieved from the Internet: URL: http://web.cs.wpi.edu/~emmanuel/courses/cs563/S05/talks/suman_wk8_IBR.pdf [retrieved on May 11, 2015].

Wang, et al., "Soft scissors: an interactive tool for real time high quality matting," ACM Transactions on Graphics (TOG), vol. 26, No. 3, ACM, 2007.

Wexler, et al., "Image-based environment matting," Proceedings of the 13 Euro graphics workshop on Rendering, Euro graphics Association, 2002.

\* cited by examiner

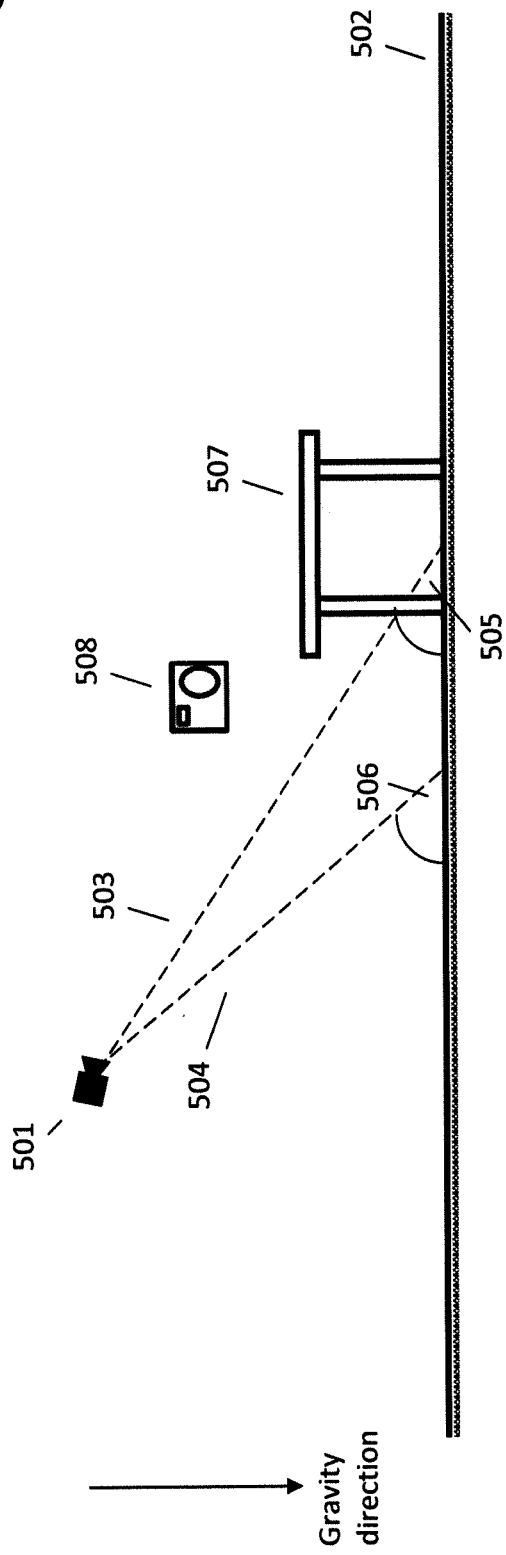
Fig. 5A

METHOD AND SYSTEM FOR PRESENTING AT LEAST PART OF AN IMAGE OF A REAL OBJECT IN A VIEW OF A REAL ENVIRONMENT, AND METHOD AND SYSTEM FOR SELECTING A SUBSET OF A PLURALITY OF IMAGES

BACKGROUND

The present disclosure is related to a method and system for presenting at least part of an image of a real object in a view of a real environment, and to method and system for selecting a subset of a plurality of images and determining at least part of a real object in at least one of the subset of the plurality of images for mapping to a view of a real environment.

Applications are known which augment a view of a real environment with one or more virtual objects using the so-called augmented reality (AR) technology. The view of a real environment may be captured as an image by a camera or captured as a visual impression by an eye, e.g. by using a so-called optical see-through device.

It is desired to correctly augment the captured view of the real environment with any virtual objects such that the virtual objects are merged with the view in a manner that the virtual objects fit in a perspectively and dimensionally correct fashion into the view of the real environment. For this, there is the need to determine the position and orientation (so-called pose) of a camera with respect to at least one part of the real environment in order to correctly augment the view of the real environment with any virtual objects.

The virtual object may be a computer generated object with a known 3D geometrical model (e.g. a CAD model or a set of 3D points). In this case, having a camera pose, the virtual object could be directly mapped or projected to a target area in an image of the real environment in a perspectively and dimensionally correct fashion. The virtual object may also be from at least part of an image of a real object captured by a camera. The image of the real object may be called a first image, and the image of the real environment may be called a second image, as also used herein below.

It is quite challenging to merge a part of the first image of the real object with the second image of the real environment in a perspectively and dimensionally correct fashion. The difficulty or challenge comes from the fact that the first image captures the real object from only one perspective view, wherein it may be difficult, or hardly possible, to represent this real object in another perspective view (e.g. the second image). Further, determining two camera poses in two different real environments where the first and second images are respectively captured is also quite difficult and prone to errors.

However, many AR applications exist, like furniture planning and room decoration, which would benefit from augmenting a view of the real environment (e.g. the second image of the real environment) with at least part of a first image of the real object. For example, the user could capture a camera image of a chair in a furniture store and augment his or her living room by overlaying the image of the chair onto a camera image of the living room. Then, the user may view the overlay on, for example, a display screen.

US 2010/0287511 A1 discloses methods and systems to merge a virtual object with a 2D image of a real environment or, by means of an optical, semi-transparent element, directly with the real environment. The virtual object is a computer generated 3D model. The method solves the problem of mutual concealments of the real environment and of the virtual object according to depth information and texture information associated with the 2D image.

US 2010/0208057 A1 discloses methods and systems for determining the pose of a camera with respect to at least one object of a real environment. It is proposed to manipulate a virtual reference model (i.e. a computer generated 3D model) in a 2D image of a real environment captured by a camera and determine distance data from a position of the virtual reference model resulted from the manipulation.

It would be beneficial to provide a method and system which supports merging or overlaying at least part of a real object of a first image with a second image of a real environment in a correct or an approximate correct perspective fashion.

SUMMARY

According to a first aspect, there is disclosed a method of presenting at least part of an image of a real object in a view of a real environment, comprising providing a first image of at least part of a real object captured by a first camera, determining at least part of the real object in the first image as an object image area, determining a first 3D plane relative to the first camera, the first camera being at a position where the first image is captured, providing at least one image feature related to the real object in the first image, providing at least one first ray passing an optical center of the first camera being at a position where the first image is captured and the at least one image feature, determining, according to a first plane normal direction of the first 3D plane, at least one first angle between the first 3D plane and the at least one first ray, providing a second image of a real environment captured by a second camera, determining a second 3D plane relative to the second camera, the second camera being at a position where the second image is captured, mapping at least part of the object image area to a target space in a view of the real environment captured at a viewpoint, wherein the at least one image feature is mapped to at least one target position in a coordinate system of the view, determining at least one second angle between the second 3D plane and at least one second ray passing the viewpoint of capturing the view and the at least one target position according to a second plane normal direction of the second 3D plane, wherein the at least one image feature is mapped to the at least one target position such that a difference between the at least one first angle and the at least one second angle is minimized.

The present disclosure discloses a method to overlay or merge at least part of a first image of a real object with a view of a real environment in a manner that at least part of the real object fits in a perspectively correct or approximately correct fashion into the view of the real environment. The perspectively correct or approximately correct fashion could mean that users would visually perceive that the real object is realistically placed in the real environment by looking at the overlay (i.e. the augmented view) through a display device, such as a display screen or semitransparent glasses.

The view of the real environment may be an image of the real environment captured by a camera, e.g. the second image of the real environment or a part of the image captured by the second camera, or a visual impression captured by one or more eyes. For example, such visual impression may be captured by one or more eyes of a user by means of an optical see-through device. For example, the second camera may be attached to such optical see-through device.

For example, the target space in the view of the real environment may be determined in a manner in order to satisfy that the angle difference between the at least one first and second angles is minimized by searching target positions or second rays (variables) in the view of the real environment until a minimization result is achieved.

One thought according to the present disclosure is that the real object that is captured by a first camera in the first image may be placed relative to a first 3D plane. For example, the real object may be a picture hanging at a wall (i.e. the first 3D plane). In another example, a chair (or any other furniture) is placed on the ground plane (i.e. the first 3D plane), which may be captured in the first image by the first camera. The image area of the chair in the first image could be mapped to a target space in a view of a living room (i.e. the real environment) such that the view of the living room could be augmented by the image area of the chair in a correct perspective or an approximate perspective manner.

According to an embodiment, the first and second cameras are the same device or different devices, and the first and second 3D planes represent a same physical plane or different physical planes.

According to an embodiment, the step of determining the at least one second angle is further according to a spatial relationship between the viewpoint and the second camera.

According to an embodiment, the step of determining the first 3D plane relative to the first camera comprises determining a first plane distance between the first 3D plane and the first camera, the first camera being at a position where the first image is captured, according to at least one of a manual input, user-interaction, depth information produced by the first camera, and vision based pose estimation, and determining the first plane normal direction of the first 3D plane relative to the first camera, the first camera being at a position where the first image is captured, according to at least one of a manual input, user-interaction, depth information produced by the first camera, vision based pose estimation, vanishing points, and at least one orientation sensor. The step of determining the second 3D plane relative to the second camera comprises determining a second plane distance between the second 3D plane and the second camera, the second camera being at a position where the second image is captured, according to at least one of a manual input, user-interaction, depth information produced by the second camera, and vision based pose estimation, and determining the second plane normal direction of the second 3D plane relative to the second camera, the second camera being at a position where the second image is captured, according to at least one of a manual input, user-interaction, depth information produced by the second camera, vision based pose estimation, vanishing points, and at least one orientation sensor.

For example, the step of determining the first 3D plane relative to the first camera does not include the user-interaction and the manual input, and the step of determining the second 3D plane relative to the second camera does not include the user-interaction and the manual input.

According to an embodiment, the method further comprises providing depth information associated with the first image.

For example, the object image area is determined according to the depth information associated with the first image.

According to an embodiment, the step of mapping the at least part of the object image area to the target space further comprises providing a plurality of image blocks contained in at least part of the object image area, and for each respective image block of the plurality of image blocks, determining a respective warping function according to depth information associated with the respective image block, and mapping the respective image block to the target space according to the respective warping function.

According to an embodiment, the method further comprises blending in the at least part of the object image area on a display device in the view of the real environment according to the result of the mapping, wherein the view comprises at least part of the second image and the viewpoint is an optical center of the second camera, or the view comprises at least part of a visual impression captured by an eye and the viewpoint is the eye.

According to an embodiment, the difference between the at least one first angle and the at least one second angle is minimized to zero.

According to an embodiment, the step of mapping the at least part of the object image area to the target space further comprises determining a warping function according to at least one of a first plane distance between the first 3D plane and the first camera, the first camera being at a position where the first image is captured, the first plane normal direction, a second plane distance between the second 3D plane and the second camera, the second camera being at a position where the second image is captured, and the second plane normal direction. The object image area is mapped to the target space according to the warping function.

For example, the warping function comprises at least one homography.

According to an embodiment, the method further comprises determining a distance difference between the first plane distance and the second plane distance. If the distance difference is below a threshold, the warping function is computed according to the first plane normal direction and the second plane normal direction.

According to an embodiment, the method further comprises extracting a plurality of 2D image features related to the object image area in the first image, determining a plurality of 3D features from the plurality of 2D image features, wherein the 3D features have 3D positions, and determining at least one optimal 3D plane relative to the first camera, the first camera being at a position where the first image is captured, wherein distances between at least part of the plurality of 3D features and the at least one optimal 3D plane are minimized, and determining a warping function according to the at least one optimal 3D plane, wherein the object image area is mapped to the target space according to the warping function.

For example, the step of determining the plurality of 3D features is at least partially based on simultaneous localization and mapping (SLAM) using images captured by the first camera.

According to an embodiment, the method further comprises providing an in-plane rotation of the first camera relative to the first 3D plane, providing an in-plane rotation of the second camera relative to the second 3D plane, wherein the step of mapping the object image area to the target space is performed according to the in-plane rotations of the first and second cameras.

According to an embodiment, the method further comprises determining a current plane distance and a current plane normal direction of the second 3D plane relative to the second camera being at a current position different from where the second image is captured by the second camera, determining a distance difference between the current plane distance and the first plane distance and/or determining a direction difference between the current plane normal direction and the first plane normal direction, determining at least one movement for moving the second camera according to the distance difference and/or the direction difference, and providing information indicative of the at least one movement for presentation to a user.

According to an embodiment, the method further comprises providing a plurality of images of at least part of the real object, each respective image of the plurality of images captured by at least one respective camera, and for each respective image of the plurality of images, determining a first spatial relationship between the first camera being at a position where the first image is captured and the respective camera being at a position where the respective image is captured in a coordinate system associated with the real object. Further, the method comprises providing a third image captured by a third camera, determining a second spatial relationship between the second camera being at a position where the second image is captured and the third camera being at a position where the third image is captured in a common coordinate system, selecting an image from the plurality of images according to differences between the second spatial relationship and a respective first spatial relationship associated with at least part of the plurality of images, determining at least part of the real object in the selected image, wherein the view of the real environment is a first view and the viewpoint is a first viewpoint, and mapping the determined at least part of the real object to a second view of the real environment captured at a second viewpoint according to a spatial relationship between the second viewpoint and the third camera or according to the second spatial relationship, wherein the second view is different from the first view.

For example, the second and third cameras are the same device or different devices.

According to an embodiment, the method further comprises determining a transparency of at least part of the real object, a first environment light for capturing the first image and/or a second environment light for capturing the second image, and rendering the object image area according to the determined transparency, the determined first environment light and/or the determined second environment light.

For example, the first 3D plane is a ground plane or a plane parallel to a ground plane, and/or the second 3D plane is a ground plane or a plane parallel to a ground plane.

According to an embodiment, determining the at least part of the real object in the first image as the object image area comprises segmenting the at least part of the real object in the first image manually and/or automatically.

According to a second aspect, there is disclosed a method of selecting a subset of a plurality of images and determining at least part of a real object in at least one of the subset of the plurality of images for mapping to a view of a real environment, comprising providing a plurality of images of at least part of a real object, each respective image of the plurality of images captured by a respective camera. For each respective image of the plurality of images a first 3D plane is determined which is relative to the respective camera being at a position where the respective image is captured. The method further comprises providing a second image of a real environment captured by a second camera, determining a second 3D plane relative to the second camera being at a position where the second image is captured, determining, for each respective image of the plurality of images, a distance difference between a second plane distance and a respective first plane distance, the second plane distance being between the second 3D plane and the second camera and the respective first plane distance being between the respective first 3D plane and the respective camera associated with the respective image, and/or determining, for each respective image of the plurality of images, a direction difference between a second plane normal direction of the second 3D plane and a respective first plane normal direction of the respective first 3D plane associated with the respective image, selecting a subset of the plurality of images according to the determined distance differences and/or the determined direction differences, determining at least part of the real object in at least one of the subset of the plurality of images as one or more object image areas, and mapping at least part of the one or more object image areas to at least one target space in a view of the real environment captured at a viewpoint.

For example, the view of the real environment may be an image of the real environment captured by a camera, e.g. the second image of the real environment or a part of the image captured by the second camera, or a visual impression captured by one or more eyes. For example, such visual impression may be captured by one or more eyes of a user by means of an optical see-through device. For example, the second camera may be attached to such optical see-through device.

According to an embodiment, the method further comprises blending in the at least part of the one or more object image areas on a display device in the at least one target space in the view of the real environment, wherein the view comprises at least part of the second image and the viewpoint is an optical center of the second camera, or the view comprises at least part of a visual impression captured by an eye and the viewpoint is the eye.

For example, the step of selecting the subset of the plurality of images comprises providing a threshold value and selecting the subset of the plurality of images such that the respective determined distance differences and/or determined direction differences related to each of the selected subset of the plurality of images are below a threshold value.

According to an embodiment, the step of selecting the subset of the plurality of images comprises providing a number N, and selecting N images as the subset of the plurality of images such that the determined distance differences and/or the determined direction differences related to the N images are the smallest among all the determined distance differences and/or the determined direction differences.

According to an embodiment, the method further comprises merging the one or more object image areas with the at least part of the second image based on image based rendering, particularly Image-Based Photo Hulls.

The first and second aspects and their respective embodiments comprise steps and features which are common or corresponding to each other in both of these aspects, as outlined in more detail below. The second aspect can be applied and performed independently from the first aspect. According to a further embodiment, the first and second aspects and their respective embodiments can also be combined with each other, as outlined in more detail below.

According to another aspect, there is disclosed a system for presenting at least part of an image of a real object in a view of a real environment, comprising a processing system which is configured to perform the steps of the method as described above with respect to the first aspect.

According to another aspect, there is disclosed a system for selecting a subset of a plurality of images and determining at least part of a real object in at least one of the subset of the plurality of images for mapping to a view of a real environment, comprising a processing system which is configured to perform the steps of the method as described above with respect to the second aspect.

Any steps, embodiments, aspects and examples described herein with respect to the methods can equally and analogously be implemented by the processing system being configured (by software and/or hardware) to perform the respective steps, embodiments, aspects or examples. Any processing device used within the processing system may be configured such and communicate via a communication network, e.g. via a server computer or a point to point communication, with one or more cameras, displays and/or any other components.

According to another aspect, the invention is also related to a computer program product comprising software code sections which are adapted to perform a method according to the invention. Particularly, the software code sections are contained on a computer readable medium which is non-transitory. The software code sections may be loaded into a memory of one or more processing devices (such as microprocessors) as described herein. Any used processing devices may communicate via a communication network, e.g. via a server computer or a point to point communication, as described herein.

BRIEF DESCRIPTION OF THE DRAWINGS

Aspects and embodiments of the invention will now be described with respect to the drawings, in which:

FIG. 5A shows another exemplary scenario in which a real environment containing a 3D plane and a table is captured in a second image by a second camera.

DETAILED DESCRIPTION

Figure 3:
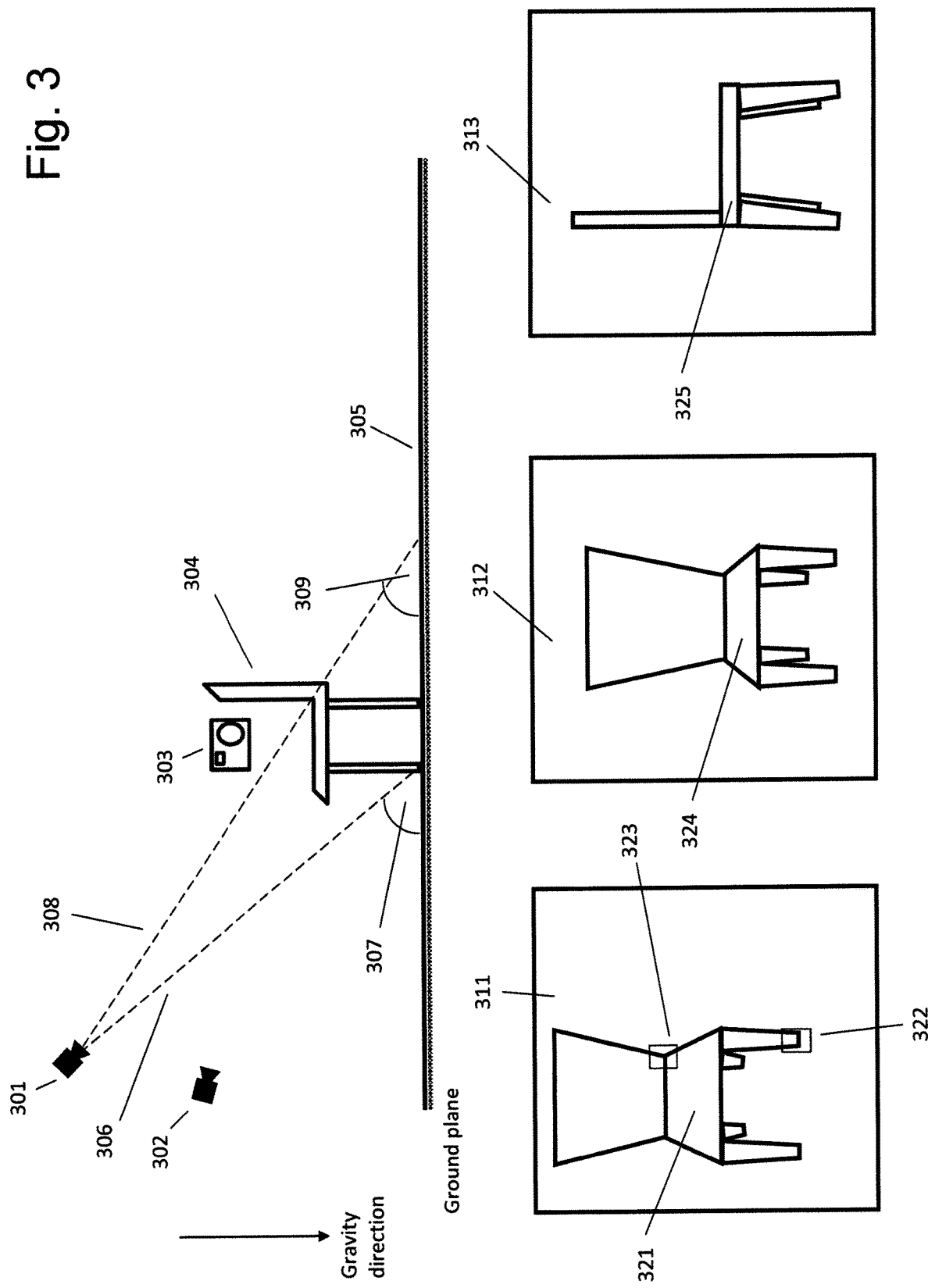
FIG. 3 shows an exemplary scenario in which a real object placed on the ground plane is captured in the first image by a first camera or captured in a plurality of first images by a plurality of first cameras.
Figure 4:
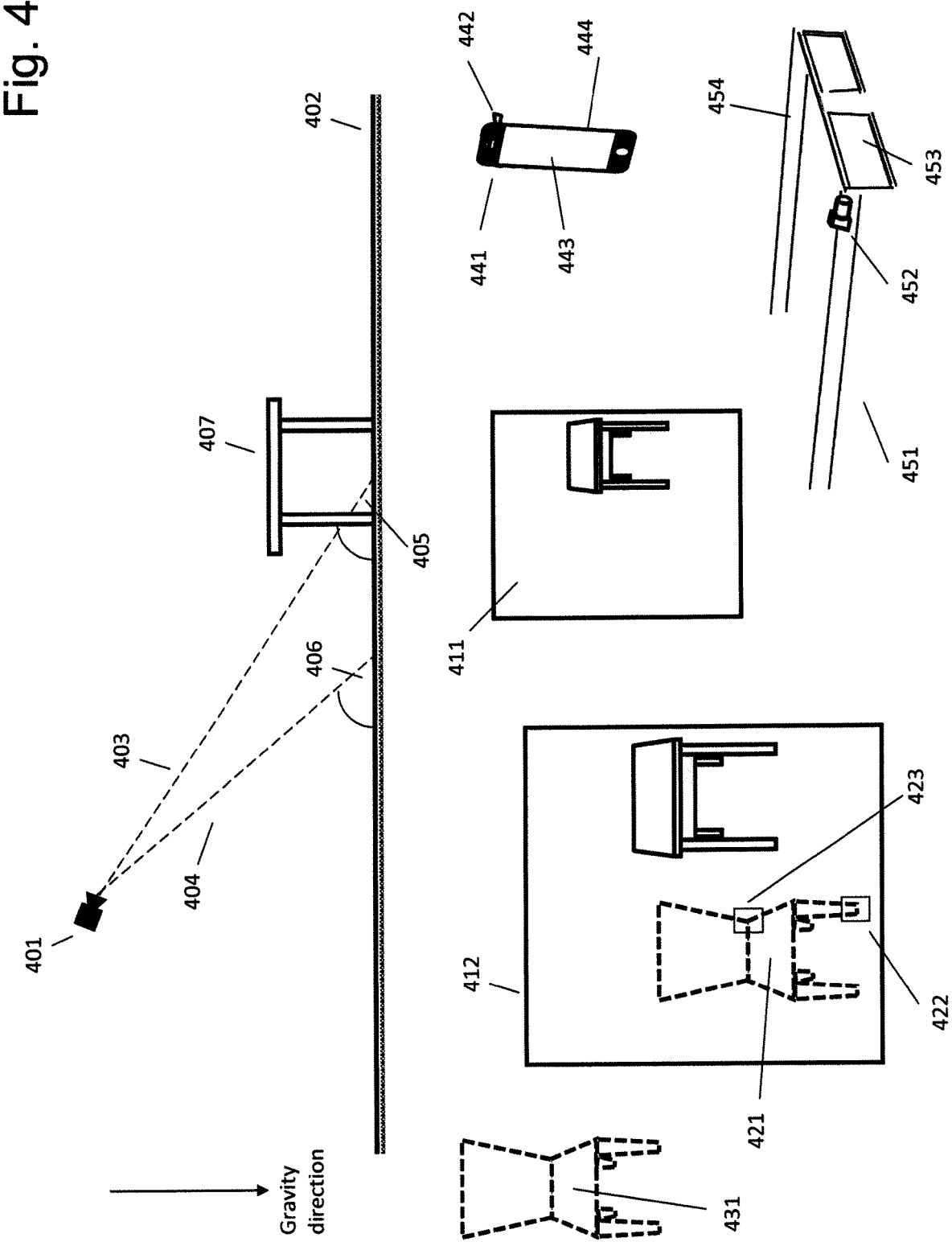
FIG. 4 shows an exemplary scenario in which a real environment containing a 3D plane and a table is captured in a second image by a second camera and shows the second image augmented by at least part of the first image.

In FIGS. 3, 4, 5A, and/or 5B, the cameras 301, 302, 303, 401, 501, and 508 may represent any camera device at the positions indicated by 301, 302, 303, 401, 501, and 508. For example, at least part of the cameras 301, 302, 303, 401, 501, and 508 may be the same camera device at the locations indicated by the respective number labels. Further, one or more of the cameras may be part of or attached to a mobile device, such as a mobile phone, wearable computer, tablet computer, mobile computer (often called laptop) or a head mounted display, such as used for optical see-through augmented reality applications.

Figure 2:
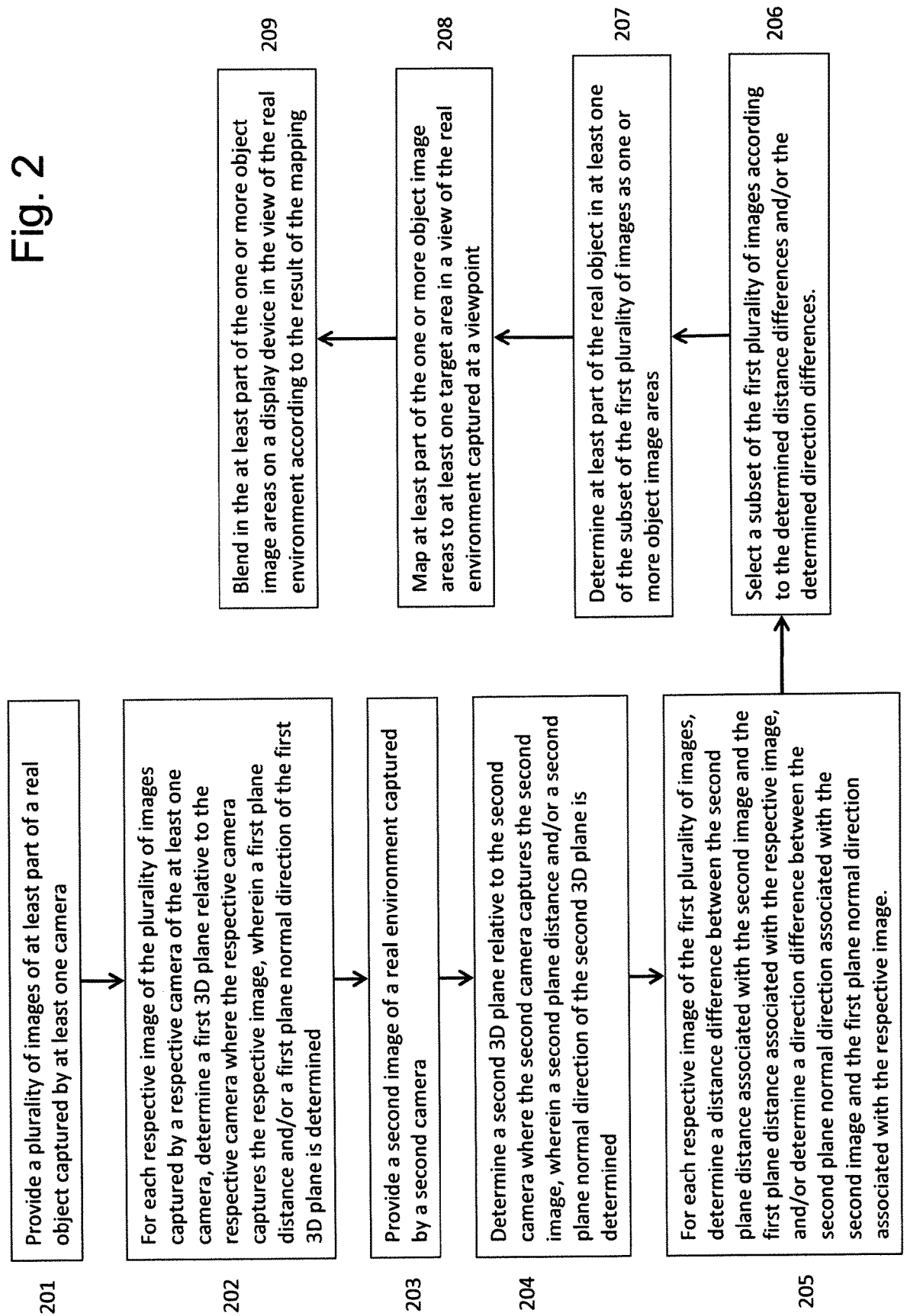
FIG. 2 shows a workflow diagram according to another embodiment of presenting at least part of an image of a real object in a view of a real environment.

The view of the real environment, as described herein, may be an image of the real environment captured by a camera or a visual impression captured by an eye. One thought behind the present disclosure is that the real object that is captured by a first camera in a first image is placed relative to a first 3D plane. For example, the real object may be a picture hanged on a wall (i.e. the first 3D plane). In another example, the chair 304 (or any other furniture) is placed on the ground plane 305 (i.e. the first 3D plane), which may be captured in the first image by the first camera (e.g. the image 311 captured by the camera 301, the image 312 captured by the camera 302, or the image 313 captured by the camera 303 as shown in FIG. 3). The image area of the chair in the first image (e.g. the image area 321 of the chair in the image 311, the image area 324 of the chair in the image 312, or the image area 325 of the chair in the image 313 as shown in FIG. 2) could be mapped to a target space in a view of a living room (i.e. the real environment) such that the view of the living room could be augmented by the respective image area of the chair in a correct perspective or an approximate perspective.

For example, according to one embodiment disclosed in the present disclosure, the image area 321 of the chair (extracted or segmented from the image 311) could be mapped to the image 411 of a living room containing the table 407 and the floor plane 402 captured by the camera 401 in order to produce the augmented image (or view) 412. The image area 321 of the chair (extracted or segmented from the image 311) could also be mapped to the image 511 of a living room containing the table 507 captured by the camera 501 in order to produce the augmented image (or view) 512. In another example, the image area 324 of the chair (extracted or segmented from the image 312) could be mapped to the image 511 of a living room containing the table 507 and the floor plane 502 captured by the camera 501 in order to produce the augmented image (or view) 513. The respective images or image areas of the chair mapped to the view of the real environment are represented by dashed lines in the augmented views.

One of the target applications is to provide users with augmented reality views (e.g. the views 412, 512, 513, and 515) such that the users would not visually perceive any perspective errors or perspective distortions from the mapped image of the chair in the view of the real environment. For such applications, the perspectively correct or approximately correct fashion could mean that users would visually perceive that the chair is placed on the floor plane of the living room and has a correct or approximately correct perspective compared to at least part of the real environment (e.g. the table) when looking at the augmented view.

Therefore, a first spatial relationship between the first camera and a first 3D plane (e.g. the ground plane 305) and a second spatial relationship between the viewpoint of capturing the view of the real environment and a second 3D plane (e.g. the floor plane 402) could be used to determine how to map the image (area) of the real object (e.g. the chair or a part thereof) contained in the first image to the target space in the view of the real environment. This is because the image (area) of the real object (e.g. the chair or a part thereof) may have to be mapped to the view such that the chair is virtually placed on the second 3D plane.

Further, another thought is that the horizontal position (two degrees of freedom) of the chair in a 3D plane and the rotation (one degree of freedom) of the chair around an axis perpendicular to the 3D plane may not be relevant to (virtually) place the chair on the 3D plane. In order to have the chair placed on the plane, the vertical distance between the chair and the plane may have to be zero.

Therefore, a first distance between the first camera where the first image is captured and the first 3D plane, and a second distance between the viewpoint of capturing the view of the real environment and the second 3D plane may be relevant to determine the mapping between the at least part of the first image and the view. The rotation around an axis parallel to the plane may also influence the mapping. When the first distance is substantially equivalent to the second distance, it is possible to determine the mapping only from the rotations of the first and second cameras relative to the first and second 3D planes, respectively, in order to produce a correct perspective mapping.

The first camera and the second camera may be the same device or different devices. The first 3D plane and the second 3D plane may be the same plane or different planes.

According to an embodiment of the present invention, the augmented image 513 provides a better visual perception regarding the perspective than the augmented image 512. One reason may be that the difference between the distance from the camera 302 to the plane 305, and the distance from the camera 501 to the plane 502 is smaller than the difference between the distance from the camera 301 to the plane 305 and the distance from the camera 501 to the plane 502. For example, the distance from the camera 302 to the plane 305 may be 100 cm, the distance from the camera 501 to the plane 502 may be 110 cm, and the distance from the camera 301 to the plane 305 may be 150 cm. Further, the distance from the camera 401 to the plane 402 may be 145 cm.

Further, another embodiment of the present invention is to select at least one image feature (e.g. image points) of the real object in the first image. It is possible to determine at least one first angle between the first 3D plane and at least one first ray passing the at least one image feature and the optical center of the first camera where the first camera captures the first image. Then, there is performed mapping the object image area (i.e. at least part of the image of the real object in the first image) to the target space (the target space may indicate both 2D and 3D space) in the view of the real environment, wherein the at least one image feature is mapped to at least one target position in the view such that a difference between the at least one first angle and at least one second angle is minimized. The at least one second angle is between the second 3D plane and at least one second ray passing the at least one target position and the viewpoint of capturing the view of the real environment.

In another exemplary scenario, when the picture (i.e. the real object) hanged on the wall (i.e. the first 3D plane) is captured in the first image, the image of the picture could also be mapped to the view of the living room such that the picture is placed on the floor plane (i.e. the second 3D plane) according to one embodiment of the present invention. This means the first and second 3D planes may not be the same or may not be parallel.

Figure 1:
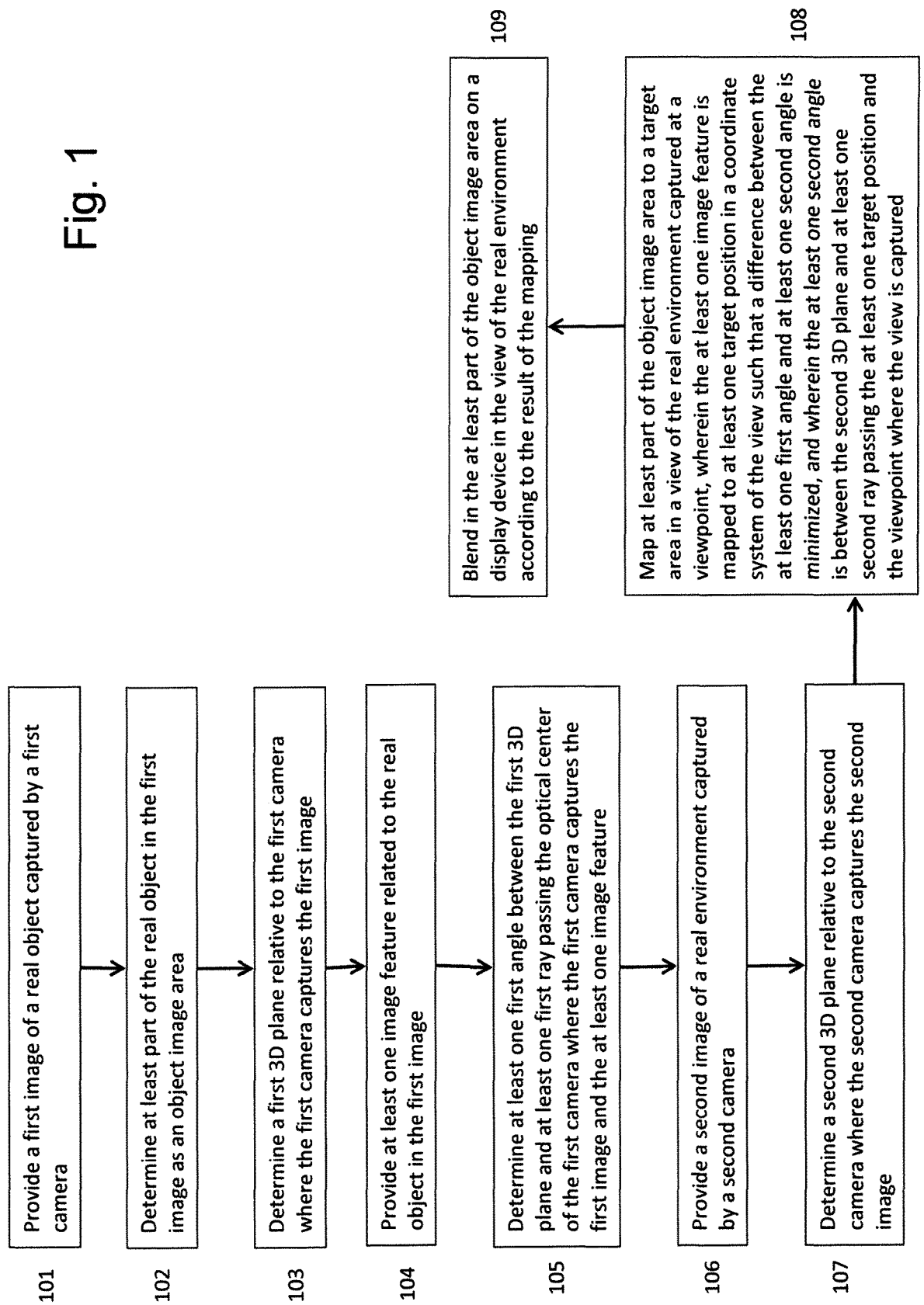
FIG. 1 shows a workflow diagram according to an embodiment of presenting at least part of an image of a real object in a view of a real environment.

FIG. 1 shows a workflow diagram of a method according to an embodiment for presenting at least part of an image of a real object in a view of a real environment, which will be explained in the following in more detail referring to the exemplary scenarios as shown in FIGS. 3-5.

Step 101 provides a first image of a real object captured by a first camera. As an example shown in FIG. 3, the real chair 304 (i.e. the real object) that is placed on the ground plane 305 is captured in the image 311 (i.e. the first image) by the camera 301 (i.e. the first camera).

Step 102 determines at least part of the real object in the first image as an object image area. In one embodiment, segmentation could be performed in order to determine the at least part of the real object in the first image. Different segmentation methods, particularly to segment real objects placed on a floor plane captured in a 2D image, are proposed in US 2010/0287511 A1. For example, depth information (associated with the first image) may serve as the initialization for a 2D segmentation in the first image, for example by means of graph cuts. The depth information associated with the first image may be alone to be used to segment the real object in the first image. For example, a floor plane may be determined by a plane fitting method according to the depth information, and then any object that is not at the floor plane may be determined according to the depth information.

It is also possible to manually determine the at least part of the real object in the first image as the object image area. For example, a user may select the object image area in the first image or give an initial region or point as an input to a segmentation algorithm. The user may also interact with the segmentation.

Various foreground matting methods (like proposed in reference [9]) may be applied to determine the object image area.

In the example shown in FIG. 3, the image region of the chair or a part of the image region in the image 311 may be determined as the object image area 321 related to the chair 304.

Step 103 determines a first 3D plane relative to the first camera, the first camera being at a position where the first image is captured. In this case, the position and orientation of the first 3D plane is estimated in a coordinate system associated with the first camera at a position that the first image is captured from. The first 3D plane may be determined based on at least three 3D points. Having the determined first 3D plane, a first plane distance and a first plane normal direction can be derived. The first plane distance represents a distance from the first camera where the first image is captured to the first 3D plane. The first plane normal direction represents the normal of the first 3D plane with respect to the first camera where the first image is captured. The first 3D plane may or may not be captured in the first image.

In general, for a 3D plane relative to an object (e.g. a camera), the plane distance of the 3D plane represents a distance from the 3D plane to the object, and the plane normal direction represents the orientation of the 3D plane relative to the object in a coordinate system associated with the object.

The first plane distance and/or the first plane normal direction may be determined manually by a user input. For example, the user may give values for the first plane distance and the first plane normal to determine the first 3D plane relative to the first camera.

In the example shown in FIG. 3, the ground plane 305 is determined as the first 3D plane relative to the camera 301 where the camera 301 captures the image 311. The ground plane 305 may be defined by a distance (i.e. the first plane distance) between the camera 301 and the ground plane 305 and/or by a normal direction (i.e. the first plane normal direction) of the ground plane 305 relative to the camera 301, indicated in FIG. 3 (and FIGS. 4, 5), for instance, by "Gravity direction" which is normal to the ground plane 305.

There are many ways to estimate a plane distance and a plane normal direction of a 3D plane relative to a camera. In one embodiment, a computer vision based pose estimation method could be employed by using at least one image captured by the camera. For example, a visual marker may be placed on the 3D plane, and the 3D plane could be determined according to one or more images of the visual marker captured by the camera. In another way, a plurality of geometrical features (e.g. points, lines, circles, etc.) on the 3D plane may be captured in the image of the camera and used to estimate the plane distance and/or the plane normal direction. For example, when there are lines (parallel lines) on the 3D plane, the theory of vanishing points of the parallel lines captured in a camera image could be used to determine the 3D plane. The lines could be obtained from the edges between walls and the ground plane for example. When the camera obtains depth information, the depth information could be used to fit a 3D plane with at least part of depth samples (e.g. minimized distances between the depth samples and the 3D plane).

In another embodiment, other sensors attached to the camera may be used to determine the 3D plane. For example, when the 3D plane is the ground plane, or any plane parallel to the ground plane, or any plane with a known angle with the ground plane (like a wall plane), a gravity sensor attached to the camera could be used to estimate the plane normal direction. The distance data may also be obtained by manipulating a virtual reference model in an image captured by the camera. From a final position of the virtual reference model resulting from the manipulation, the distance data could be computed. The final position of the virtual reference model may be decided by a user who manipulates the reference model and checks the appearance of the virtual reference model that would change according to the manipulation. When the user has an idea how the appearance of the reference model should be in the image of the camera, the user could place the reference model such that appearance of the reference model is correct. For example, the reference model may be a sofa (or a table), and the user knows how the sofa looks in the camera image when the sofa is placed on the ground plane.

In a further embodiment, the plane distance or the plane normal direction may be manually provided by a user or from an interaction process with the user. In one implementation, the user may manipulate the mapped object image area (e.g. change dimensions) in a view of the real environment. For example, the user may modify the size of the mapped chair 421 (represented by dashed lines) in the augmented view 412. The modified size may be used alone to estimate the plane distance or together with at least one of the methods mentioned above to estimate the plane distance.

Step 104 provides at least one image feature related to the object image area. The at least one image feature has coordinates (e.g. 2D position) in a coordinate system of the first image. The at least one image feature may be, but not limited to, point, edge, square, or circle image features. The at least one image feature in the first image may be manually determined or automatically detected by an image feature detection method. In FIG. 3, the image features 322 and 323 related to the image region (or area) 321 of the chair are provided in the image 311. Each of the image features 322 and 323 represents at least part of corners or edges of the chair in the image 311. The image features 322 and 323 may be detected using corner detection methods. The image features 322 and 323 could be represented based on pixel information of their respective rectangle regions by using high level descriptors, like scale-invariant feature transform (SIFT), speeded up robust features (SURF), etc. The image features 322 and 323 could also represent points, e.g. the center points of their respective rectangle regions.

Step 105 determines at least one first angle between the first 3D plane and at least one first ray passing the at least one image feature in the first image and the optical center of the first camera, the first camera being at a position where the first camera captures the first image. Having camera intrinsic parameters (e.g. focal length and principal points), the 2D position of the at least one image feature in the first image could be transformed to a 3D position in the coordinate system of the first camera. The at least one first ray could then be determined in the coordinate system of the first camera in the 3D space. Having the first plane normal direction of the first 3D plane relative to the first camera, the at least one first angle between the first 3D plane and the at least one first ray could be computed. In the example shown in FIG. 3, the ray 306 passes the optical center of the camera 301 where the camera 301 captures the image 311 and the position of the image feature 322 in the image 311. The angle 307 is between the ray 306 and the 3D plane 305. The ray 308 passes the optical center of the camera 301 where the camera 301 captures the image 311 and the position of the image feature 323 in the image 311. The angle 309 is between the ray 308 and the 3D plane 305.

Step 106 provides a second image of a real environment captured by a second camera. For example, in the scenario shown in FIG. 4, the second camera may be the camera 401 that captures a living room (i.e. the real environment) including the floor plane 402 and the table 407 in the image 411 (i.e. the second image). In FIG. 5A, the second camera may be the camera 501 or 508 that captures the image 511 or 514 (i.e. the second image) of a living room (i.e. the real environment) including the floor plane 508 and the table 507. The second camera and the first camera may be the same device or different devices. For example, the camera 401 (i.e. the second camera) and the camera 301 (i.e. the first camera) may be the same device or different devices.

Step 107 determines a second 3D plane relative to the second camera where the second camera captures the second image. In this case, the position and orientation of the second 3D plane is estimated in a coordinate system associated with the second camera at a position that the second image is captured from. The second 3D plane may be determined based on at least three 3D points. Having the determined second 3D plane, a second plane distance and a second plane normal direction can be derived. The second plane distance represents a distance from the second camera to the second 3D plane. The second plane normal direction represents the normal of the second 3D plane with respect to the second camera. The second 3D plane may or may not be captured in the second image. Further, the first 3D plane and the second 3D plane may be the same plane or different planes.

Figure 5B:
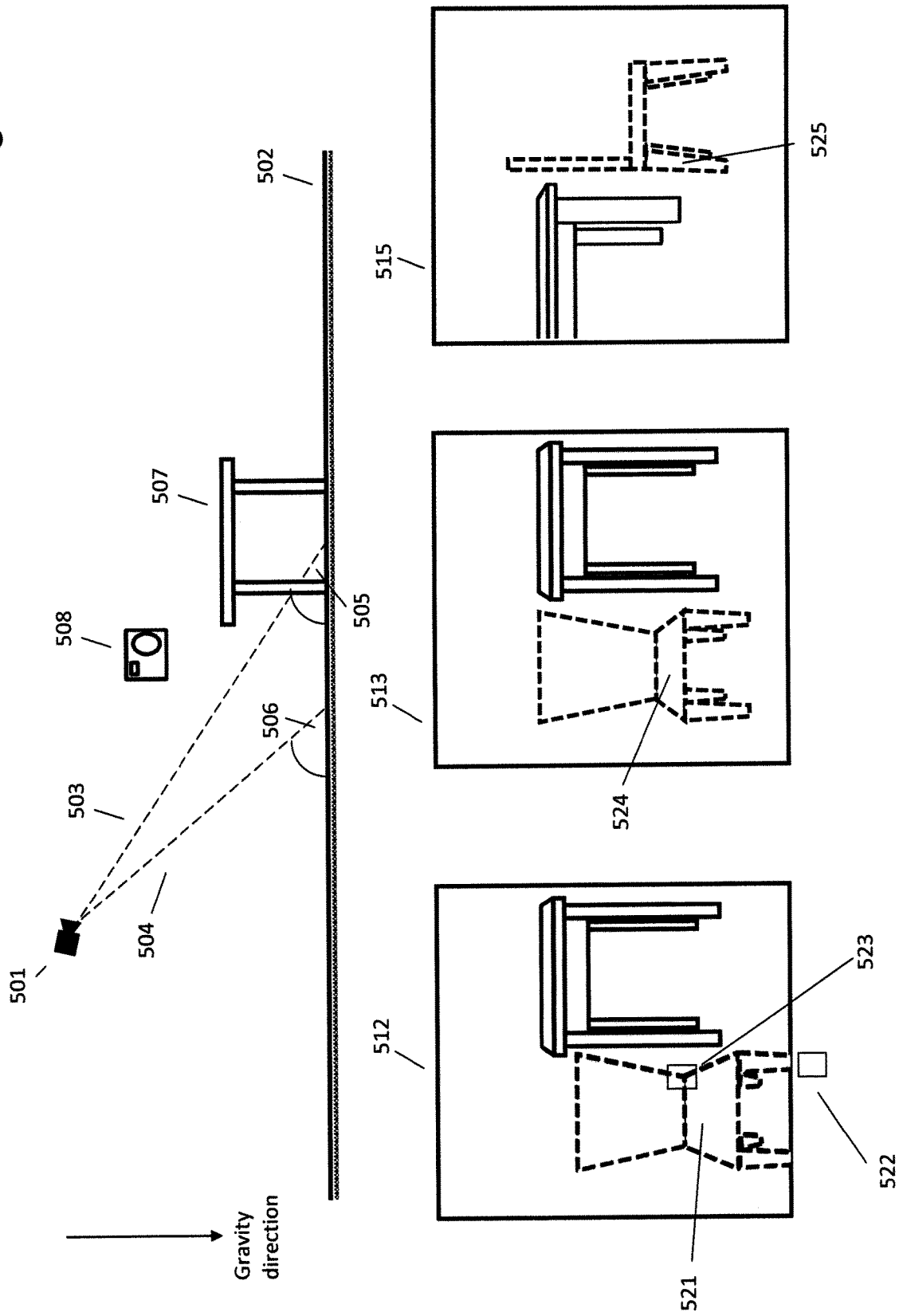
FIG. 5B shows another exemplary scenario in which a real environment containing a 3D plane and a table is captured in a second image by a second camera and further shows the second image augmented by at least part of the first image.

Methods as proposed in connection with step 103 could be employed to determine the second 3D plane, e.g. the second plane distance and the second plane normal direction, relative to the second camera. In the scenario shown in FIG. 4, the second 3D plane is the 3D plane 402. In FIG. 5A or 5B the second 3D plane is the 3D plane 502.

Step 108 maps at least part of the object image area to a target space in a view of the real environment captured at a viewpoint. The at least one image feature is mapped to at least one target position in a coordinate system of the view such that a difference between the at least one first angle and at least one second angle is minimized. The at least one second angle is between the second 3D plane and at least one second ray passing the at least one target position and the viewpoint where the view is captured. In this step, the object image area may not be mapped to the view of the real environment, but how to map (e.g. a warping function) is determined.

In FIG. 4 or FIG. 5A, the view of the real environment may comprise at least part of the image 411, 511 or 514. In these examples, the viewpoint is the optical center of the camera 401, 501 or 508 where the camera captures the image 411, 511 or 514, respectively. The image 411, 511 or 514 may be a 2D image or a 3D image (e.g. having depth information).

According to another embodiment, the view of the real environment may comprise at least part of a visual impression of the real environment captured by an eye. The viewpoint is related to the eye. For example, the viewpoint is at the position of the eye.

According to an embodiment, the view of the real environment may comprise stereoscopic views of the real environment. The viewpoint is related to one or more points from that the stereoscopic views are observed or captured. For example, the viewpoint may be at the center between the two points from that the stereoscopic views are observed or captured.

The object image area 321 may be overlaid or mapped to the image area 421 (i.e. the target space) in the image 411 to produce an augmented view 412. The object image area 321 of the chair may be transformed or warped to the coordinate system of the image 411 (as shown by the chair represented by dashed lines in the image area 421) by applying a warping function (e.g. one or more homographies) to the object image area 321. The image features 322 and 323 would be mapped to the target positions 422 and 423 (i.e. the at least one target position) in the coordinate system of the image 411 according to the applied warping function. The warping function may map or transform a set of 2D coordinates to another set of 2D coordinates. The warping function may map or transform between 2D and/or 3D coordinates. For example, the warping function could be a projection transformation that transforms between 2D and 3D coordinates.

In FIG. 4, the ray 404 passing the target position 422 in the image 411 and the optical center of the camera 401 where the camera captures the image 411 could be determined based on the target position 422. Similarly, the ray 403 passing the target position 423 in the image 411 and the optical center of the camera 401 where the camera captures the image 411 could be determined based on the target position 423. Further, the angle 406 between the ray 404 and the 3D plane 402 and the angle 405 between the ray 403 and the 3D plane 402 could be determined according to the normal direction (here: "Gravity direction") of the 3D plane 402 relative to the camera 401.

A target position in the second image for an image feature of the first image may not be within the second image, but still has a position in the coordinate system of the second image. In FIG. 5B, a part of the object image area 321 may be overlaid or mapped to the image area 521 (i.e. the target space) in the image 511 to produce the augmented view 512. The image features 322 and 323 would be mapped to the target positions 522 and 523 (i.e. the at least one target position) in the coordinate system of the image 511. In this example, the target position 522 is out of the image 511, but still has a position in the coordinate system of the image 511.

The image area 421 in the image 411 may be determined in order to satisfy that the angle difference between the angles 406 and 307 and/or the angle difference between the angles 405 and 309 are minimized by searching target positions or second rays (variables) in the image 411. Similarly, the image area 521 in the image 511 may be determined in order to satisfy that the angle difference between the angles 506 and 307 and/or angle difference between the angles 505 and 309 are minimized.

When a pair of two angles (e.g. the pair of the angles 406 and 307 or the pair of the angles 405 and 309) is used (i.e. searching a target position or a second ray), it is possible to minimize the difference to zero. For example, the angles 406 and 307 have to be equivalent. In one case, it is possible to first identify (i.e. search) a ray passing through the optical center of the camera 401 such that an angle between the ray and the 3D plane 402 is equivalent to the angle 307 (called equivalent angle condition). Then, the intersection between the identified ray and the image plane of the camera 401 could define a target position, to which the at least one image feature is mapped.

For an image feature in the first image and the related first angle (e.g. image feature 322 in the image 311 and the angle 307), it may also be possible to find multiple rays (i.e. multiple target positions in the second image) that satisfy the equivalent angle condition. Thus, multiple target positions in the second image may be determined for an image feature of the first image to be mapped. Other constraints could be used to select a target position from the multiple target positions. For example, either the x or the y coordinate of the target position in the coordinate system of the second image may have to be a predefined value or within a range.

When there are multiple image features from the first image, multiple pairs of two angles (e.g. the pair of the angles 406 and 307 and the pair of the angles 405 and 309) may be used. Then, the sum of the differences of each respective pair may be minimized. For the minimization, constraints may have to be considered.

For example, the image area 321 of the chair could be mapped to the intermediate image 431 of the chair (in dashed line) by an intermediate warping function. Then, the intermediate image could be placed in the second image according to the at least one target position. The intermediate image (e.g. the image 431) may put a constraint that all the target positions could coincide with the image features of the intermediate image at the same time when the intermediate image is placed (e.g. with applying rigid transformations, e.g. translate or rotate the intermediate image) in the second image. For example, the intermediate image 431 is placed in the image 411 such that the relevant image features coincide with the target positions 422 and 423.

The warping function that maps the at least part of the object image area of the first image to the target space of the second image may be determined by the result of determining the target positions and/or together with the minimization of the angle difference (i.e. the procedure of searching target positions).

In an embodiment, the warping function (e.g. comprising multiple homographies) may be determined according to the at least one target position. When there are four target positions in the second image and corresponding positions of, e.g., four image features in the first image, then the warping function (e.g. a homography) may be uniquely computed based on 2D-2D correspondences between the target positions in the second image and the positions of the image features in the first image.

In an embodiment, in addition to the at least one target position, the warping function may further be determined according to at least one of the first plane distance, the first plane normal direction, the second plane distance, and the second plane normal direction. Particularly, the warping function may be determined according to the first and second plane normal directions. Normally, the first and/or second plane distances could determine the size of the target space, when the first and/or second plane distances are considered for the determination of the warping function.

In an embodiment, the warping function may be determined according to the position of at least one optimal 3D plane relative to the first camera, the first camera being at a position where the first camera captures the first image. It is well known that a warping function (e.g. homography) may be valid only for image points whose 3D corresponding positions are at the same 3D plane (like in reference [8]). The perspective error (in pixels) may increase for image points whose 3D corresponding positions are away from that 3D plane. It is beneficial to find at least one optimal 3D plane such that distances between 3D positions related to image points of at least part of the real object in the first image and the at least one optimal 3D plane are minimized.

It is also possible to estimate multiple optimal 3D planes, each of which corresponds to a part of the real object (i.e. a part of the object image area) in the first image. The different optimal 3D planes would result in different homographies for mapping different parts of the object image area.

In the example shown in FIG. 3, the image 311 (i.e. the first image) captures the chair 304 (i.e. the real object). In this case, an optimal 3D plane may be determined such that distances between the optimal 3D plane and a plurality of 3D features (i.e. 3D positions related to a plurality of image features, like 3D points corresponding or related to 2D image points) of at least part of the chair 304 captured in the image 311 are minimized. For this, having the plurality of 3D features, a plane fitting method could be employed to find a 3D plane that fits to the plurality of 3D features. To obtain multiple 3D planes, classification methods could be used to classify the plurality of 3D features into multiple groups such that each of the groups could be used to fit one 3D plane. In the example of the chair, there might be two optimal 3D planes fitting the chair, one for the back of the chair, and other for the sitting part of the chair. Having at least one optimal plane, it may not be necessary to satisfy the equivalent angle condition and find the at least one target position in order to estimate the warping function and map the object image area of the first image to the view of the real environment.

The plurality of 3D features could be determined from corresponding 2D image features. For example, the image 311 has associated depth information (e.g. captured by a depth camera). The depth information related to an image feature may be indicative of a distance between the camera 311 and the part of the chair corresponding to that image feature. 3D positions for images features (e.g. the feature 322 and 323) could be directly computed from their depth information and 2D image coordinates. 3D positions may also be estimated from at least two camera images using various computer vision methods, like simultaneous localization and mapping (SLAM) proposed in [1].

In an embodiment, a respective warping function may be determined for each of a plurality of image blocks contained in at least part of the object image area. For example, for each respective image block of the plurality of image blocks, a respective warping function according to depth information associated with each respective image block may be determined. The respective image block may be mapped to the target space according to the respective warping function. The image block may contain sub-pixel, one pixel, or multiple pixels. In this case, it may not be necessary to satisfy the equivalent angle condition and/or find the at least one target position in order to estimate the warping function and map the object image area of the first image to the view of the real environment.

In an embodiment, the warping function may be determined according to the first and second plane normal directions. A warping function that maps between a 2D coordinate system (e.g. of the first image) and another 2D coordinate system (e.g. of the second image) may only depend on relative rotations between two poses of the cameras where the two images are captured. This requires that there is no translation between the two positions of the cameras where they capture the two images. As discussed before, the real object (e.g. the chair) placed on the first 3D plane (e.g. the ground plane 302) captured in the first image (e.g. the image 311) will be used to augment the second image (e.g. the image 411) such that the real object (e.g. the dashed line chair 421) appears in the second image in a manner that it is placed on the second 3D plane (e.g. the plane 402). The position constraint is the vertical distance along the plane normal. Thus, when the first and second images are captured by the first and second cameras at a same plane distance to the first and second 3D plane, respectively, the warping function may be determined according to the first and second plane normal directions. In this case, the equivalent angle condition and/or the at least one target position is not necessary for determining the warping function and mapping the object image area of the first image to the view of the real environment.

A spatial relationship ("rotation" or "rotation and translation"), between the two positions of the two cameras (or one camera) where they capture the first and second images, may be needed to determine the warping function.

A plane normal direction gives two degrees of freedom (DOF). A rotation of a camera (or any object) in the 3D space could have three DOF. In one embodiment, the one missing rotation DOF may be arbitrary given, as this missing rotation DOF would not influence a correct perspective for mapping the object image area of the first image (e.g. image area 321 in the image 311) to the second image (e.g. the image 411). This is because the real object (e.g. the chair 304) is still on a 3D plane after any rotation around the plane normal. However, the missing rotation DOFs for both the first and second cameras may be given the same value.

An in-plane rotation of the camera is a rotation around the plane normal of a 3D plane in a coordinate system associated with the 3D plane. For example, North may define or determine a coordinate system associated with the ground plane. An in-plane rotation of a camera relative to the ground plane or any 3D plane parallel to the ground plane may be determined from a compass and/or gyroscope device attached to the camera. In another example, when a visual marker is placed on a 3D plane, an in-plane rotation of the camera relative to this 3D plane could also be estimated. Any vision based tracking or pose estimation method could also be used to estimate the in-plane rotation of the camera.

In a further embodiment, the in-plane rotation of the first camera relative to the first 3D plane, the first camera being at a position where the first image is captured, and/or the in-plane rotation of the second camera relative to the second 3D plane, the second camera being at a position where the second image is captured, may be used to determine the warping function or map to the at least part of the object image area to the target space.

The user could map the at least part of the object image area to the view of the real environment differently by using different values of the in-plane rotations. This would have visual effects like (virtually) rotating the real object in the view of the real environment.

It is also possible to first determine an intermediate warping function according to at least one of the first plane distance, the first plane normal direction, the second plane distance, and the second plane normal direction. The intermediate warping function could transform or map the at least part of the object image area of the first image to an intermediate image.

According to an embodiment, it is beneficial to further provide a method to guide the user to move from a current viewpoint to an optimal viewpoint, at which the view of the real environment is captured.

It may not be possible to map the object image area of the first image to a current view in a correct or approximate correct perspective manner. Thus, it may be necessary to capture an optimal view of the real environment at another position (e.g. the optimal viewpoint) which is different from where the current view is captured.

For this, it may be necessary to determine a third plane distance and a third plane normal direction of the second 3D plane relative to the second camera at a position (corresponding to the current view) different from where the second image is captured by the second camera. Then, the third plane distance may be compared with the first plane distance and/or the third plane normal direction may be compared with the first plane normal direction. For example, the difference between the third plane distance and the first plane distance may be used to translate the viewpoint by such difference.

As an example shown in FIG. 5A together with FIG. 4, the camera 501 and the camera 401 may be the same camera device (i.e. the second camera), and the 3D plane 402 and the 3D plane 502 may be the same plane (i.e. the second 3D plane). In this case, the second camera is at different positions (indicated by 501 and 401) relative to the second plane.

The current image (i.e. the current view) may be the image 511 captured by the second camera at the current position (indicated by 501) relative to the 3D plane. The first image is the image 311 captured by the camera 301. It may not be possible to map the object image area 321 of the image 311 to the image 511 in a correct perspective manner as shown in the augmented image 512. A distance difference between the distance from the camera 501 (i.e. the current position of the second camera) to the plane 502 and the distance from the camera 301 to the plane 305 may be determined. According to the distance difference, the second camera is moved from the current position (indicated by 501) to an optimal position (indicated by 401 in FIG. 3) as shown by the camera 401 relative to the 3D plane. The movement may comprise a translation that has a value as the distance difference or a value different from the distance difference within a tolerance. In this case, the image 411 is the second image (i.e. the optimal view of the real environment) and is captured by the second camera at the position 401 that is the optimal viewpoint. Then, the object image area 321 of the image 311 could be mapped to the image 411 according to any method mentioned above to produce an augmented view 412 in a correct or approximately correct perspective manner.

Having the optimal view of the real environment captured from the optimal viewpoint, the equivalent angle condition and/or the at least one target position may not be necessary for determining the warping function and mapping the object image area of the first image to the optimal view of the real environment. In this example, the current view (i.e. the image 511) may not be captured.

According to an embodiment, the method further includes a step of providing information indicative of at least one movement of moving the current viewpoint for presentation to a user. For example, display arrows on the display device or generate an audio instruction.

Most examples and embodiments disclosed above are given in the case when the view of the real environment is the second image. They all can also be applied in the case when the view of the real environment is a visual impression of the real environment captured by an eye. The second image may still be needed in order to estimate spatial relationships between the eye and at least part of the real environment (e.g. the second 3D plane). For this, the second camera that captures the second image may need a known spatial relationship with the eye.

When the second image is the view of the real environment, the spatial relationship between the viewpoint and the second camera may be known implicitly as an identity transformation (i.e. the viewpoint is the optical center of the second camera).

Step 109 blends in the at least part of the object image area on a display device in the view of the real environment according to the result of the mapping.

The view of the real environment may comprise at least part of an image of the real environment captured by a camera or at least part of a visual impression of the real environment captured by an eye.

The view of the real environment may comprise 2D information. The view of the real environment may also comprise 3D information of the real environment. For example, the image of the real environment may have associated depth information.

An augmented view (e.g. the augmented view 412, 512 or 513) may be seen by a user using a video see-through device comprising a camera and a display screen. For example, the tablet 441 comprising the camera 442, the display screen 443 and a processing device 444 (such as a microprocessor, not explicitly shown) is used herein as a video see-through device. In this case, the real environment is captured in an image (e.g. the image 411 or 511) by the camera 442 of the video see-through device. The at least part of the object image area (e.g. shown by the dashed lines 421, 521 or 524) and the relevant image of the real environment (e.g. the image 411, 511, or 514) may be shown on the display screen 443 to the user.

A merging of the at least part of the object image area with a visual impression of the real environment can also be seen by a user in a well-known optical see-through device having semi-transparent glasses. For example, the head mounted display 451 comprising a camera 452, semi-transparent glasses 453, and a processing device 454 (such as a microprocessor, not explicitly shown) is an optical see-through device. A spatial relationship between the camera 452 and an eye of the user may have to be estimated or provided. It may be sufficient to estimate a spatial relationship between the camera 452 and the semi-transparent glasses 453. The position of the eye may be related to the position of the semi-transparent glasses 453. The position of the semi-transparent glasses 453 may also represent the position of the eye.

In this case, the user then sees through the semi-transparent glasses the real environment augmented with the at least part of the object image blended in in the semi-transparent glasses. In this case, the dashed lines 421, 521 or 524 in the augmented view 412, 512 or 513 will be displayed on the semi-transparent glasses and the view of the real environment (corresponding to the image 411 or 511) would be directly observed by the user.

After obtaining the augmented view by mapping at least part of the object image area of the image 311 (i.e. the first image) to the view of the real environment (called a first view hereafter), a second view may be captured at another position (a second viewpoint) different from the first viewpoint.

The second view may be augmented by mapping another image (different from the first image) of at least part of the real object to the second view.

In addition to the first image that captures at least part of the real object, at least part of the real object may be captured in a plurality of images by the same or different cameras (i.e. at least one camera) from multiple viewpoints. The at least one camera that capture the plurality of images may be the same or different from the first camera that captures the first image. For example, the image 311 may be the first image. In addition to the image 311, the chair 304 may be further captured in the images 312 and 313 by the cameras 302 and 303. The cameras 301, 302, and 303 may be the same device or different devices. The real object may also be placed at different places relative to different 3D planes when the plurality of images of at least part of the real object are captured. For example, the chair may be placed on different floors in a building. For each respective image of the images 312 and 313, a spatial relationship SR1 (i.e. rotation and/or translation in the 3D space) between the camera 301 (i.e. the first camera) where it captures the image 311 (i.e. the first image) and the respective camera where it captures the respective image in a coordinate system fixed relative to the chair 304 (i.e. the real object) may be determined. For the estimation or determination of the spatial relationship SR1, vision based SLAM (like proposed in [1]) methods could be employed based on two images of the chair 304. Further, a gravity sensor, GPS, and/or digital compass attached to the first camera and the respective camera could be used to estimate at least part of the spatial relationship SR1.

The second view may be a third image captured by a third camera at a location different from where the second image is captured by the second camera. The second and third cameras may be the same or different devices. The second view may also be a visual impression captured by the same or different eye that captures the first view. In the scenario shown in FIG. 5A, the real environment includes the table 507 and the floor plane 502. The second image (i.e. the first view of the real environment) may be the image 511 captured by the camera 501, and the third image (i.e. the second view of the real environment) may be the image 514 captured by the camera 508. The cameras 501 and 508 may be the same device or different devices, while the cameras 501 and 508 locate at different positions relative to the real environment.

At least part of the image of the real object contained in a desired image that is one of the plurality of images of at least part of the real object may be mapped to the second view according to the positions of the first and second viewpoints. The image of the real object of the desired image may be determined as determining the object image area of the first image, as disclosed above.

In one case, as shown in FIG. 5B, the user who looks at the augmented view 513 (or 512) based on the first view 511 may move to another place to take the second view 514, and therefore the real object may have to be presented in the second view of the real environment (e.g. in order to provide the augmented view 515). In this case, the first image may not be able to provide a correct or approximately correct perspective view to augment the second view by at least part of the real object, so other images of at least part of the real object may be used for the augmentation. To select the desired image out of the plurality of images of at least part of the real object, a spatial relationship SR2 between the second and third cameras capturing the second and third images respectively in a common coordinate system may be determined. The common coordinate system may be associated with at least part of the real environment, or the second 3D plane or the earth (e.g. defined by North). As in the case shown in FIG. 5A, the spatial relationship SR2 between the cameras 501 and 508 (i.e. the second and third cameras) could be estimated based on vision based SLAM methods according to the images 511 and 514. The table 507 captured in the images 511 and 514 could provide enough features for the SLAM methods. In this example, the common coordinate system could be defined by the table 507 (i.e. a part of the real environment).

Then, differences between the spatial relationship SR2 and the spatial relationship SR1 associated with each of the plurality of images of at least part of the real object may be computed. The difference may be a translation and/or rotation difference. In one embodiment, a respective image of the plurality of images whose associated SR1 has the smallest difference among the plurality of images may be selected as the desired image. In another example, any image of the plurality of images whose associated SR1 has the difference bellow a threshold may be selected as the desired image.

The translation difference may be a difference between their translations along directions orthogonal (or parallel) to the second (or third) 3D plane. The translation difference may be a difference between the translational parts of the spatial relationships SR2 and SR1. The rotation difference may be an angle difference between their in-plane rotations or an angle difference between their rotations with respect to the relevant plane normal directions.

As in scenarios shown in FIGS. 4, 5A and 5B, the image 312 has an associated SR1 and the image 313 also has an associated SR1 as explained above. Both the SR1 associated with the images 312 and 313 will be compared to the SR2 between the cameras 501 and 508. For example, only rotation parts (e.g. the in-plane rotation of the SR1 relative to the plane 305 and the in-plane rotation of the SR2 relative to the plane 502) are compared, and the SR1 associated with the image 313 is closer to the SR2 than the SR1 associated with the image 312 according to the comparison. The image 313 is selected as the desired image. The image of the chair is determined as the image area 325 in the image 313.

The image area 325 is mapped to the image 514 (i.e. the second view) as dashed lines 525 to produce the augmented view 515. The mapping could be performed in any way of mapping the object image area of the first image to the first view as disclosed above (like for step 108). Another direct way of mapping the image area 325 to the image 514 could be based on the result (e.g. the determined warping function) of the mapping the object image area of the first image to the first view and the spatial relationship SR2 and/or SR1 associated with the selected desired image.

In one implementation, when the SR2 and the SR1 are equivalent or substantially equivalent (e.g. below predefined thresholds), the determined object image area of the selected image may be mapped to the second view according to a warping function, which may be the same as the warping function used to map the object image area of the first image to the first view. In another implementation, the warping function used to map the object image area of the first image to the first view may be modified according to the spatial relationship SR2 and/or SR1. The modified warping function may be used to map the object image area of the third image to the second view.

The augmented view 515 may be presented on the normal screen of the video see-through device 441 or on the semi-transparent glasses of the optical see-through device 451 to the user.

Advanced visualization of the augmented views:

Images of at least part of the real object (e.g. the first image) may be captured in a light condition called a first environment light, and the first view of the real environment (e.g. the second image) may be captured in a light condition called a second environment light. For example, the images 311, 312, and 313 of the chair 304 may be captured outside with a sunlit environment. The images 411, 511 and 514 may be captured indoors. The environment light may be estimated based on light sensors or camera images of the environment.

One approach of estimating environment light is to create a panoramic image of the real environment by using an omni-camera (like in [3]) or by capturing an image of a mirror sphere (like in [2]). The environment light could be estimated according to the panoramic image. Another approach of estimating environment light is based on an image of the real environment and a known model of the real environment (like in [1]). Therefore, the first and second environment light may be estimated from the first and second image respectively.

An augmented view (like the augmented view 412, 515, 513, or 515) may be displayed or rendered according to the first and/or second environment light. For example, the contrast or brightness of the object image area of the first image may be adjusted according to relative intensity of the first and/or second environment light. The contrast or brightness of the second image may also be adjusted accordingly when the view of the real environment comprises at least part of the second image.

Further, the transparency of at least part of the real object may be determined or provided. The transparency of at least part of the real object could be determined from the first image using methods like in [5, 6].

The object image area of the first image may be rendered in the view of the real environment according to the determined transparency and the environment light based on methods like in [5, 7].

Further, the real color and/or texture of the real object (e.g. the chair) captured in the first image may have to be provided or determined. Color bleeding may be caused by surfaces of the real object are colored by reflection of colored light from nearby surfaces. For this, the color bleeding may be removed from texture of the real object in the first image using a method like proposed in [10].

Another aspect of the present invention is related to selecting a set of images from a plurality of images of at least part of a real object and mapping (at least a part of) an image of the real object contained in the set of images to a view of the real environment.

FIG. 2 shows a workflow diagram according to an embodiment.

Step 201 provides a plurality of images of at least part of a real object captured by at least one camera. For example, the chair 304 placed on the ground plane 305 is captured in the images 311, 312 and 313 by the cameras 301, 302 and 303. The cameras 301, 302 and 303 may be the same device or different devices.

In step 202, for each respective image of the plurality of images captured by a respective camera of the at least one camera, a first 3D plane relative to the respective camera where the respective camera captures the respective image is determined. A first plane distance to the respective camera and/or a first plane normal direction of the first 3D plane may be derived or determined in a coordinate system associated with the respective camera being at a position where the respective image is captured. The first 3D plane may or may not be captured in the respective image. Further, the first 3D plane related to different respective images may be the same or different.

For each respective image, the determination of the first 3D plane, or the determination of the first plane distance and the first plane normal direction, may be the same as disclosed above, particularly in step 103.

For the scenario shown in FIG. 3, the ground plane 305 is determined as the first 3D plane for each of the images 311, 312 and 313. The plane parameters (e.g. the plane distance and plane normal direction) of the ground plane 305 may be determined in the coordinate systems associated with the cameras 301, 302, and 303, respectively.

Step 203 provides a second image of a real environment captured by a second camera. In the scenario shown in FIG. 4, the second camera may be the camera 401 that captures a living room (i.e. the real environment) including the floor plane 402 and the table 407 in the image 411 (i.e. the second image), or in FIG. 5A, the second camera may be the camera 501 or 502 that captures the image 511 or 514 (i.e. the second image) of a living room (i.e. the real environment) including the floor plane 508 and the table 507.

Step 204 determines a second 3D plane relative to the second camera where the second camera captures the second image. Having the second 3D plane determined relative to the second camera, a second plane distance to the second camera and a second plane normal direction of the second plane may be determined in a coordinate system associated with the second camera being at a position where the second image is captured. The second 3D plane may be the floor plane 402 as shown in FIG. 4.

In step 205, for each respective image of the plurality of images, a distance difference between the second plane distance associated with the second image and the first plane distance associated with the respective image, and/or a direction difference between the second plane normal direction associated with the second image and the first plane normal direction associated with the respective image is determined. For example, the plurality of images comprises the images 311, 312, and 313. The second image is the image 411. For each of the images 311, 312, and 313, a distance difference (e.g. in mm) is computed and/or a direction difference (e.g. represented by an angle) is computed.

Step 206 selects a subset of the plurality of images according to the determined distance differences and/or the determined direction differences. In one implementation, those images are selected if respective associated distance differences and/or direction differences are below a certain threshold. In another embodiment, those images are selected if respective associated distance differences and/or direction differences are the smallest among all the distance differences and/or direction differences.

For example, the plurality of images comprises the images 311, 312, and 313 captured by the cameras 301, 302, and 303, respectively. The second image is the image 411 captured by the camera 401. The distance from the camera 302 to the plane 305 may be 100 cm, the distance from the camera 303 to the plane 305 may be 95 cm, and the distance from the camera 301 to the plane 305 may be 150 cm. Further the distance from the camera 401 to the plane 402 may be 145 cm. In the example, the image 311 may be selected according to the distance differences.

Step 207 determines at least part of the real object in at least one of the subset of the plurality of images as one or more object image areas. A similar method as mentioned above, particularly as in step 102, may be employed to determine the one or more object image areas.

Step 208 maps at least part of the one or more object image areas to at least one target space in a view of the real environment captured at a viewpoint. The view of the real environment may comprise at least part of the second image or at least part of a visual impression captured by an eye. The mapping could be performed according to any way of mapping methods disclosed above (like for step 108). However, when the determined distance difference related to the selected image is equivalent to or close to zero (e.g. within 5% of the first plane distance), a warping function could be directly determined from the related direction difference (e.g. the warping function may be estimated by using the method proposed in [8]). The one or more object image areas could be mapped to the view of the real environment according to the warping function. In this step, the one or more object image areas may not be mapped to the view of the real environment, but how to map (e.g. the warping function) is determined.

Further, the one or more object image areas may be merged based on image based rendering or Image-Based Photo Hulls (which is known per se). Then, the merged image of the one or more object image areas would be mapped to the view of the real environment.

Step 209 blends in the at least part of the one or more object image areas on a display device in the view of the real environment according to the result of the mapping. Similar methods as disclosed in step 109 could be used.

The merging of computer-generated, virtual information with an image of the real environment may be seen by a user using a video see-through device comprising a camera and a display screen. In this case, the real environment is captured in an image by the camera. The merging of the virtual information and the captured image is shown on the display screen to the user.

The merging of computer-generated, virtual information with a visual impression of the real environment can also be seen by a user in a well-known optical see-through device having semi-transparent glasses. In this case, the user then sees through the semi-transparent glasses the real environment augmented with the virtual information blended in in the semi-transparent glasses.

A mobile device (e.g. the tablet 441 or the wearable device 451) comprising one or more cameras and one or more display screens may be used. The one or more cameras could capture the real object and/or the real environment. The augmented view or images may be presented on the one or more display screens. All the disclosed methods, aspects and embodiments may be performed by one or more processing devices embedded, e.g., in a mobile device as shown. All the disclosed methods, aspects and embodiments may also be performed at least in part on a server computer that communicates with the mobile device wirelessly or via cables. Thus, any step as disclosed herein could be either executed locally in the mobile device or sent to a remote server computer or another mobile device through the wireless network unit.

According to an embodiment, the processing system as described herein may be comprised at least in part in one of the mobile devices and/or in a server computer (not explicitly shown). The processing system may be comprised in only one of these devices, e.g. in the mobile device or in the server computer, or may be a distributed system in which one or more processing tasks (performing one or more method steps) are distributed and processed by one or more processing devices which are distributed and are communicating with each other.

Generally, the following further aspects and embodiments may be applied in connection with aspects of the invention.

Camera:

A camera may also be called an imaging device or capturing device. The proposed invention can generally be applied to any camera providing images. It is not restricted to cameras providing color images in the RGB format. It can also be applied to any other color format and also to monochrome images for example to cameras providing images in grayscale format or YUV format.

A camera often has intrinsic parameters including focal length and principal point. A camera may capture light that is visible to the human eye. A camera may also capture light that is invisible to the human eye, such as infrared light. For example, a camera may be a thermal imaging camera or infrared camera.

A camera may also provide an image with depth data. Such camera (may be called a depth camera) could be a time of flight (TOF) camera or a passive stereo camera or an active stereo camera based on structured light. A camera may provide images whose pixels represent depth data. A camera may capture both the light and depth data in a single image, e.g. a RGB-D image. For such camera, the depth data does not need to be provided in the same resolution as the (color/grayscale) image. In this disclosure, a depth camera may be used to capture images of the real object and/or the real environment.

For a standard camera model with a simplified pinhole or fisheye camera model, only light falling through a single point, i.e. the pinhole, is measured.

According to the invention, there may further be used a light field camera that could capture an image from multiple different viewpoints and optionally with different focuses for the different viewpoints. Light field cameras are not limited to capturing only light falling through a single point but measure also a plurality of light intensities incident at different locations.

A camera may also be simulated by a virtual camera. A virtual camera is defined by a set of parameters and can create images of virtual objects or scenes, which are synthetic images. A crucial parameter of a virtual camera may be its pose, i.e. 3D translation and 3D orientation with respect to the virtual object or scene. Virtual cameras may map an object in 3D space onto a 2D space. For example, a virtual camera could map a 3D object onto a 2D image plane. The mapping of the virtual camera may be the pinhole camera model and in this case the camera's intrinsic parameters include the focal length and the principal point. Virtual cameras may also use the fisheye camera model or simulate arbitrary optics. Common implementations of virtual cameras use the OpenGL rasterization pipeline, ray casting or ray tracing. In any case virtual cameras create views (i.e. two-dimensional images) of (potentially 3D) virtual objects by approximations of the capturing process happening when a real camera images a real object. In Augmented Reality, the intrinsic and extrinsic parameters of a camera are usually chosen to be consistent either with a real camera or such that they correspond to a setup of an augmented reality system.

Image:

An image is any data depicting or recording visual information or perception. An image could be a 2-dimensional image. An image could also be a 3-dimensional image, e.g. a depth image.

An image could be a real image or a synthetic image. A real image may be captured by a camera. For example, the camera could capture an object of interest or a part of the object of interest in a real image. The synthetic image may be generated automatically by a computer or manually by a human. For example, a computer rendering program (e.g. based on openGL) may generate a synthetic image of an object of interest or a part of the object of interest. The synthetic image may be generated from a perspective projection as it is captured by a camera. The synthetic image may be generated according to orthogonal projection.

An image may capture an object that reflects, refracts, and/or emits light that is visible and/or invisible to the human eye. An image may be in the RGB format. It can also be applied to any other color format and also to monochrome images, for example in grayscale format or YUV format. For example, an infrared image could capture an object that reflects, refracts, and/or emits light that is invisible to the human eye.

A depth image may be a 2D (color/grayscale) image with a corresponding depth map. A depth image does not need to be provided in the same resolution as a 2D image. A depth image may also be called 3D image. A depth image may only provide depth data. An image may be a mixture of real and virtual images.

Display Screen:

A display screen could visually display digital information. A display screen could be a reflective or emissive screen, e.g. LCD, LED, or OLED.

In augmented reality applications, the visual integration of digital information (e.g. a virtual object) and a real object may be performed using a video-see-though device which comprises a camera and a reflective or emissive screen. In this configuration the camera captures an image of the real object or environment and then displays the captured image overlaid with a spatially registered computer-generated virtual object on the display screen. This configuration is referred to as video-see-through AR.

The display screen could also be a semi-transparent screen, like known google glasses. One example is to place an optical-see-though device between the user's eye(s) and the real object. The real object can then be directly observed through this semi-transparent screen of the optical-see-though device, while the virtual object is computer-generated and shown on the semi-transparent screen. This configuration is referred to as optical-see-through AR.

At least part of the display screen may be planar (e.g. a display surface) and may have a normal direction associated with the planar part. Typically, the normal direction is perpendicular to the planar part. The normal direction typically points from the display device to a user who observes, in front of the display device, visual information displayed on the at least part of the display device. At least part of the display screen may also be curved.

(Image) Feature:

A feature of an object is used to denote a piece of information related to the object. The piece of information may be visually perceivable to anatomical eyes or optical imaging devices. For example, a real object may emit or reflect visible light that could be captured by human eyes or cameras. The real object may also emit or reflect invisible light that could not be captured by human eyes, but could be captured by a camera (i.e. is optically perceivable). In another example, the feature may be associated with a virtual object (i.e. computer-generated object). The feature of the virtual object may be known or detectable in a computer or computer program, like computer graphic simulation software.

A feature may describe specific colors and/or structures, such as blobs, edge points, a particular region, and/or more complex structures of a real object. A feature may be represented by an image patch (e.g. pixel intensity) or a high level descriptor (e.g. SIFT, SURF).

A feature may have 3D position and/or 3D orientation information in 3D Euclidean space relative to a coordinate system of the real object. This is often called a 3D feature. A feature may also be expressed in 2D space. For example, a feature (i.e. a piece of information related to the real object) may be extracted from an image of the real object captured by a camera, and thus the feature may have 2D image position and/or orientation in a coordinate system of the image. This is often called 2D feature or image feature.

When a camera could provide depth information, a feature extracted from an image of the camera may also have 3D position and/or orientation information. A feature could be described by an equation that describes a geometric shape, for example a point, a ray, a straight line, a circle, a cone, or a cylinder.

Methods to detect features in an image that could be used in a method according to the invention include, but are not limited to, local extrema of Laplacian of Gaussian (LoG), Difference of Gaussians (DoG) or Determinant of Hessian (DoH), Maximally Stable Extremal Regions (MSER), Harris features, or learning-based corner detectors such as FAST. Also, methods that detect edges (edge elements) are suitable to be used in such methods. The feature detection method to be used is not limited to approaches working on a 2D intensity grayscale image, but can also be performed on images in any other color space, including RGB, HSV, and Lab, or range images that either exclusively contain depth information or provide both depth and intensity information.

A method to describe features can work on any of the types of images explained above and may include SIFT (Scale-invariant feature transform), SURF (Speeded Up Robust Feature), GLOH (Gradient Location and Orientation Histogram), HOG (Histogram of Oriented Gradients), 2.5D-SIFT, or any other method to compare local features including classification-based methods like Random Ferns.

Real Object and Environment:

A real object physically exists in the real world. A real object could be, e.g., an indoor office or an outdoor scene. A real object could also be or include another real object, such as a sofa, a car, a human, a tree, a building, or a picture.

A real environment may be a real object. A real environment may also comprise one or more real objects. For example, a living room may be a real environment, which may contain real objects, like a chair and a table.

The invention claimed is:

1. A method of presenting at least part of an image of a real object in a view of a real environment, comprising:
   obtaining a first image of at least part of a real object captured by a camera from a first camera pose, wherein a portion of the first image comprising the real object comprises an object image area;
   determining a first 3D plane on which the real object is placed;
   determining at least one first ray passing through an optical center of the camera at the first camera pose and the object image area;
   determining a first spatial relationship comprising at least one first angle between the first 3D plane and the at least one first ray, and a depth of the first 3D plane;

obtaining a second image of a real environment captured from a second camera pose;

determining a target space in a view of the real environment captured from the second camera pose, wherein the target space comprises a second 3D plane;

determining a second spatial relationship comprising at least one second angle between the second 3D plane and at least one second ray passing from the second camera pose to the target space, and a depth of the second 3D plane;

applying one or more warping functions to the object image area based on the first spatial relationship and the second spatial relationship to obtain a warped object image area; and blending in the warped object image area into the second image, wherein the at least part of the real object appears from the perspective of the second camera pose.

2. The method according to claim 1, wherein determining a first spatial relationship comprises:

determining a first plane distance between the first 3D plane and the first camera pose according to at least one selected from a group consisting of a manual input, user-interaction, depth information produced by the first camera, and vision based pose estimation; and determining a first plane normal direction of the first 3D plane relative to the first camera pose according to at least one of selected from a group consisting of a manual input, user-interaction, depth information produced by the first camera, vision based pose estimation, vanishing points, and at least one orientation sensor, wherein the at least one first angle is determined according to the first plane normal direction.

3. The method according to claim 2, wherein the at least one warping function is determined according to at least one of the first plane distance between the first surface and the first camera pose, the first plane normal direction, a second plane distance between the second surface and the second camera pose, and a second plane normal direction, wherein the object image area is warped according to the at least one warping function.

4. The method according to claim 1, wherein the object image area is determined according to the depth information associated with the first image.

5. The method according to claim 4, wherein applying the one or more warping functions further comprises:

obtaining a plurality of image blocks contained in at least part of the object image area;

determining, for each respective image block of the plurality of image blocks, a respective warping function according to depth information associated with the respective image block; and warping the respective image block to the target space according to the respective warping function.

6. The method according to claim 5, wherein the respective warping function comprises a homography.

7. The method according to claim 1, further comprising:

displaying the at least part of the warped object image area on a display device in the view of the real environment of the second image.

8. A non-transitory computer readable medium comprising computer readable code executable by one or more processors to:

obtain a first image of at least part of a real object captured by a camera from a first camera pose, wherein a portion of the first image comprising the real object comprises an object image area;

determine a first 3D plane on which the real object is placed;

determine at least one first ray passing through an optical center of the camera at the first camera pose and the object image area;

determine a first spatial relationship comprising at least one first angle between the first 3D plane and the at least one first ray, and a depth of the first 3D plane;

obtain a second image of a real environment captured from a second camera pose;

determine a target space in a view of the real environment captured from the second camera pose, wherein the target space comprises a second 3D plane;

determine a second spatial relationship comprising at least one second angle between the second 3D plane and at least one second ray passing from the second camera pose to the target space, and a depth of the second 3D plane;

apply one or more warping functions to the object image area based on the first spatial relationship and the second spatial relationship to obtain a warped object image area; and blending in the warped object image area into the second image, wherein the at least part of the real object appears from the perspective of the second camera pose.

9. The non-transitory computer readable medium of claim 8, wherein the computer readable code to determine a first spatial relationship comprises computer readable code to:

determine a first plane distance between the first 3D plane and the first camera pose according to at least one selected from a group consisting of a manual input, user-interaction, depth information produced by the first camera, and vision based pose estimation; and determine a first plane normal direction of the first 3D plane relative to the first camera pose according to at least one of selected from a group consisting of a manual input, user-interaction, depth information produced by the first camera, vision based pose estimation, vanishing points, and at least one orientation sensor, wherein the at least one first angle is determined according to the first plane normal direction.

10. The non-transitory computer readable medium of claim 9, wherein the at least one warping function is determined according to at least one of the first plane distance between the first surface and the first camera pose, the first plane normal direction, a second plane distance between the second surface and the second camera pose, and a second plane normal direction, wherein the object image area is warped according to the warping function.

11. The non-transitory computer readable medium of claim 8, wherein the object image area is determined according to depth information associated with the first image.

12. The non-transitory computer readable medium of claim 11, wherein the computer readable code to apply the one or more warping functions further comprises computer readable code to:

obtain a plurality of image blocks contained in at least part of the object image area;

determine, for each respective image block of the plurality of image blocks, a respective warping function according to depth information associated with the respective image block; and warp the respective image block to the target space according to the respective warping function.

13. The non-transitory computer readable medium of claim 12, wherein the respective warping function comprises a homography.

14. The non-transitory computer readable medium of claim 8, further comprising computer readable code to:

display the at least part of the warped object image area on a display device in the view of the real environment of the second image.

15. A system for presenting at least part of an image of a real object in a view of a real environment, comprising:

one or more processors; and a memory coupled to the one or more processors and comprising computer readable code executable by the one or more processors to cause the system to:

obtain a first image of at least part of a real object captured by a camera from a first camera pose, wherein a portion of the first image comprising the real object comprises an object image area;

determine a first 3D plane on which the real object is placed;

determine at least one first ray passing through an optical center of the camera at the first camera pose and the object image area;

determine a first spatial relationship comprising at least one first angle between the first 3D plane and the at least one first ray, and a depth of the first 3D plane;

obtain a second image of a real environment captured from a second camera pose;

determine a target space in a view of the real environment captured from the second camera pose, wherein the target space comprises a second 3D plane;

determine a second spatial relationship comprising at least one second angle between the second 3D plane and at least one second ray passing from the second camera pose to the target space, and a depth of the second 3D plane;

apply one or more warping functions to the object image area based on the first spatial relationship and the second spatial relationship to obtain a warped object image area; and blending in the warped object image area into the second image, wherein the at least part of the real object appears from the perspective of the second camera pose.

16. The system of claim 15, wherein the computer readable code to determine a first spatial relationship comprises computer readable code to:

determine a first plane distance between the first 3D plane and the first camera pose according to at least one selected from a group consisting of a manual input, user-interaction, depth information produced by the first camera, and vision based pose estimation; and determine a first plane normal direction of the first 3D plane relative to the first camera pose according to at least one of selected from a group consisting of a manual input, user-interaction, depth information produced by the first camera, vision based pose estimation, vanishing points, and at least one orientation sensor, wherein the at least one first angle is determined according to the first plane normal direction.

17. The system of claim 16, wherein the at least one warping function is determined according to at least one of the first plane distance between the first surface and the first camera pose, the first plane normal direction, a second plane distance between the second surface and the second camera pose, and a second plane normal direction, wherein the object image area is mapped to the target space warped according to the warping function.

18. The system of claim 15, wherein the object image area is determined according to depth information associated with the first image.

19. The system of claim 18, wherein the computer readable code to apply the one or more warping functions further comprises computer readable code to:

obtain a plurality of image blocks contained in at least part of the object image area;

determine, for each respective image block of the plurality of image blocks, a respective warping function according to depth information associated with the respective image block; and warp the respective image block to the target space according to the respective warping function.

20. The system of claim 15, further comprising computer readable code to:

display the at least part of the warped object image area on a display device in the view of the real environment of the second image.

* * * * *

UNITED STATES PATENT AND TRADEMARK OFFICE
CERTIFICATE OF CORRECTION

Page 1 of 1

PATENT NO. : 10,659,750 B2
APPLICATION NO. : 15/328349
DATED : May 19, 2020
INVENTOR(S) : Peter Meier et al.

It is certified that error appears in the above-identified patent and that said Letters Patent is hereby corrected as shown below:

In the Claims

Claim 17, at Column 30, Lines 27-28: Delete the phrase "mapped to the target space"

Signed and Sealed this
Fifteenth Day of September, 2020

Andrei Iancu
*Director of the United States Patent and Trademark Office*